July 21, 1931.   J. C. SHAW ET AL   1,815,594
SCREW DRIVER SCREW HOLDING DEVICE
Filed Oct. 1, 1929
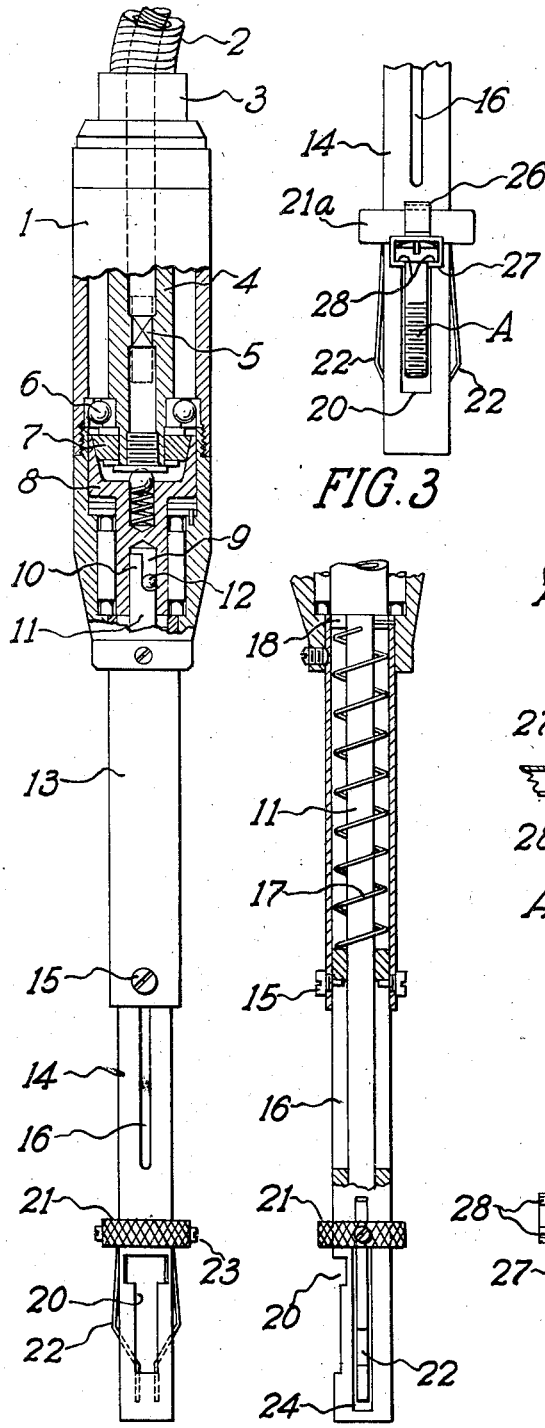
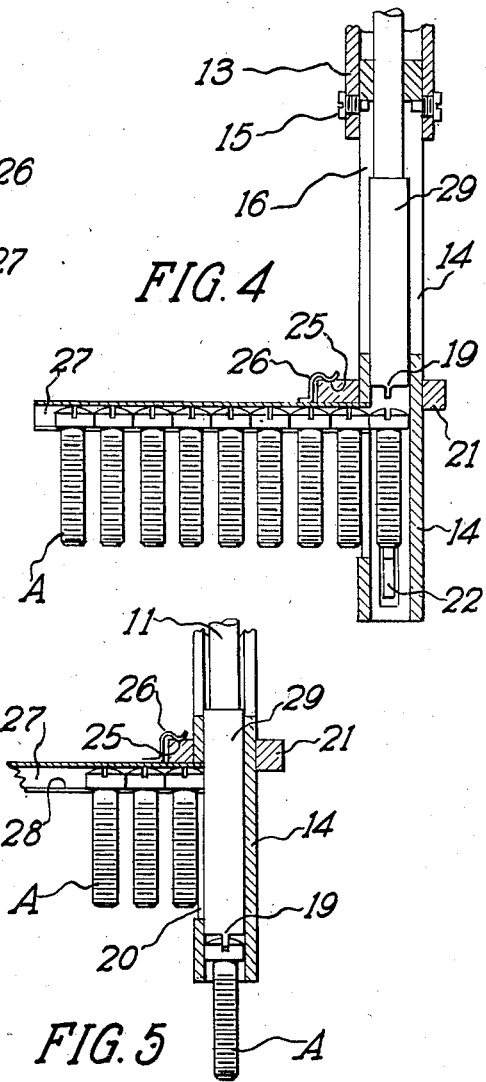
INVENTOR
John C. Shaw and
BY Robert D. Shaw
ATTORNEY Patented July 21, 1931

1,815,594

UNITED STATES PATENT OFFICE

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK

SCREW DRIVER SCREW HOLDING DEVICE

Application filed October 1, 1929. Serial No. 396,431.

This invention relates more particularly to a device in which screws may be inserted one at a time, in front of the screw driver bit and held in place while the bit drives the screw home. One object of the present improvement is to provide such a device as an integral part of a screw driver adapted to be driven by power from a flexible shaft or otherwise, the arrangement being such that it may be operated with one hand. It will be understood, however, that certain features need not be limited to power screw drivers.

A further object is to provide the device with a tube for holding the screw to be set resiliently slidable longitudinally and provided with suitable clips for retaining the screw in the holder until it is properly set or driven home.

In the preferred form, it is arranged for dropping the screws into the tubular holder, one at a time, through a suitable slot or opening and a further object is to provide a magazine for supporting a plurality of screws in position to be fed through the slotted opening in the holder successively, as the screws are set.

The magazine feed is not always required and an additional feature of the improvement is that the magazine chute is formed of thin sheet metal and arranged to be readily attached to or detached from the screw-holding tube, and when attached, is adapted to register with the lateral opening in the tube for the entrance of the screw.

For the purpose of illustrating the improvement, one form thereof is shown in the accompanying drawings, in which Fig. 1 shows a plan view partially in section of the screw-holding device in connection with a power operated screw driver; Fig. 2 is a broken away and partially sectional view of the telescoping portion of the screw-holding device; Fig. 3 is a plan view of the lower end of the tube of the holding device, showing the slot or opening for inserting the screws and the relation of the magazine chute thereto; Fig. 4 is a side view of the magazine chute with the telescoping tubular screw-holder in section, showing screws in the magazine and a screw in the holder in front of the screw driver bit; Fig. 5 is a similar view to Fig. 4, partially broken away and intended to show the screw driver bit and the screw engaged thereby, in the lower end of the holding tube; and Fig. 6 is a plan view looking from the underside of the magazine chute.

Referring to the drawings, it will be seen that a power screw driver is illustrated and it is provided with a handle 1, at the upper end of which a flexible shaft 2 is indicated as attached by the usual screw plug 3, so as to be connected with a spindle 4 rotatably mounted in the handle, substantially as indicated in Fig. 1, the flexible shaft being connected to the spindle in any suitable manner, as by a square socket at 5. The spindle 4 is preferably mounted on ball bearings 6 and provided with a friction cone 7 adapted to cooperate with a driven cone clutch member 8, provided with a chuck socket at 9, adapted to receive the upper end 10 of the screw driver bit 11, which, in the present instance, is flattened or cut away, so as to cooperate with a key pin 12 to prevent it turning in and to connect the screw driver bit to friction drive of the spindle, so that it may be rotated by the flexible shaft.

A tubular extension 13 is secured to the lower end of the handle 1, concentrically of and surrounding the shank of the screw driver bit 11, as illustrated in Fig. 2. A screw-holding member 14, preferably tubular and surrounding the bit 11, extends outward from the tubular handle extension 13 and is adapted to telescope therein, being slidably mounted for movement longitudinally of the screw driver bit 11. Screws 15 cooperate with elongated slots (or grooves) 16 to form a pin and slot connection between the tubular extension 13 and the telescoping screw-holder 14 to permit longitudinal movement of the latter and at the same time prevent relative rotation thereof.

In order to resiliently retain the screw-holding telescoping member 14 in its outer or extreme position, as indicated in the drawings, and permit longitudinal movement thereof when driving a screw, a spring 17, coiled in the tubular extension 13, about the shank of the bit 11 is adapted to thrust against the end of the telescoping member 14 and against a suitable thrust collar 18 in the handle.

As illustrated in Figs. 1, 2 and 3, the lower end of the telescoping screw-holding member 14 is adapted to extend beyond the screw driver bit, that is beyond the blade or driving end 19 (Fig. 4), and is preferably provided with a T-shaped slot or lateral opening 20 for inserting the screws to be driven, into the holder in front of the end 19 of the screw driver bit.

Associated with the lower end of the screw-holding member 14, located just above the opening 20, there is secured thereto a knurled collar or finger piece 21, adapted to enable the screw-holding member to be manipulated manually. In connection with this knurled finger piece 21, in the present instance, spring clips 22 are secured to the lower end of the screw-holding member by means of screws 23 passing through the knurled finger piece 21, as shown in the drawings. The lower end of the tubular screw-holder 14 beyond the finger piece 21, is provided with narrow slotted openings 24, extending almost to the end of the tube, and the spring clips 22 are adapted to extend through these openings 24, well toward the center of the tube, so as to be in position to engage the screw inserted into the holder through the opening 20. The spring clips 22 serve to center the screw in the holder and retain it in position to be engaged by the blade of the bit and will not release the screw, ordinarily, until it is driven home.

The screw driver screw-holding device thus far described is adapted for one hand operation, after the individual screws are dropped into the slot 20, one at a time. It is sometimes required to provide a magazine for supplying a number of screws successively and, in the present instance, it is preferable to slightly change the shape of the finger piece 21 and provide it with an extension 21a, formed with a notch or groove 25, into which may be sprung a tongue 26, stamped and pushed out from a sheet metal run-way or magazine 27, adapted to hold a plurality of screws by their heads, as indicated in Figs. 3 to 6, the magazine extending at right angles to the screw-holder so that the screws are in position to enter the opening 20 one at a time, as may be required. The run-way or magazine 27 for the screws is preferably formed out of sheet metal folded over as indicated in Fig. 3, so as to provide tracks 28 on the underside, for engaging the heads of the screws as indicated in the drawings and particularly in Fig. 6.

From the above description, it will readily be understood that the operation is comparatively simple, the screw to be set being inserted through the opening 20 into the lower end of the screw-holder, where it will be centered and held in place by the spring clips 22, so as to be in position to be engaged by the blade or lower end 19 of the screw driver bit. When the latter is forced down to drive the screw, the tubular screw-holding member 14 will be slid longitudinally of the bit into the tubular extension 13 against the thrust of the spring 17 until the screw is driven home. When the screw driver and holder are withdrawn from driving the screw, the spring 17 will move the telescoping member 14 outward to its extreme position again and another screw may be inserted through the opening 20 in front of the end of the bit and the operation repeated.

It will be seen that when a plurality of screws are to be driven in succession, the magazine 27 may be attached (at 21a) to the appropriate finger piece 21 by means of the spring tongue 26 and held in position thereby, so as to permit the screws A to ride along the tracks 28 and enter the slot or opening 20 in the holder each time the end of the bit 19 is brought back to the position shown in Fig. 4. When the magazine 27 is used, it is preferable that the lower end of the screw driver bit hould be enlarged to fit the tubular screw-holder and the enlargement elongated as indicated at 29, to cover the opening 20 during the movement of the screw-holder relative to the bit in driving the screws, in order to prevent a second screw from entering the slot, while the first screw is being driven. In this way, it will be seen that a plurality of screws may be rapidly driven in succession with one hand, thus providing a strictly one-hand device.

It will be understood that the form shown is merely illustrative and it is desired that the claim should not be limited thereby, for it will be understood that various modifications in the specific details of construction may be made without departing from the spirit and scope of the invention.

Claim:—

A power screw driver screw-holding device, comprising a handle provided with a centrally extending rotary bit, a tubular member surrounding the upper portion of said bit and secured to said handle, a telescoping tube surrounding the lower end of said bit and adapted to slide in and in fixed relation to said tubular member, a compression spring in said tubular member for normally holding said telescoping tube projecting fully out of said tubular member, means for limiting the outward movement of said telescoping tube and preventing rotation thereof relative to said tubular member, spring fingers mounted on the lower end of said telescoping tube and extending through slots therein for engaging and centering the screw, a collar-like annular flange above the lower end of said telescoping tube, means for attaching said spring fingers to said collar, said collar-like flange being provided with a lateral lug extension, and a sheet metal screw-holding chute having means for detachably engaging said lug, said chute being adapted to hold a plurality of screws and direct them one at a time into said tube between said spring fingers.

JOHN C. SHAW.
ROBERT D. SHAW.